United States Patent
Fontana et al.

(10) Patent No.: US 6,239,741 B1
(45) Date of Patent: May 29, 2001

(54) UWB DUAL TUNNEL DIODE DETECTOR FOR OBJECT DETECTION, MEASUREMENT, OR AVOIDANCE

(75) Inventors: Robert J. Fontana, Rockville; J. Frederick Larrick, Bethesda; Jeffrey E. Cade, Burtonsville, all of MD (US)

(73) Assignee: Multispectral Solutions, Inc., VA (US)

( * ) Notice: Subject to any disclaimer, the term of this patent is extended or adjusted under 35 U.S.C. 154(b) by 0 days.

(21) Appl. No.: 09/118,919

(22) Filed: Jul. 20, 1998

(51) Int. Cl.[7] .............................. G01S 7/285; G01S 7/28; H04L 25/02
(52) U.S. Cl. .............................. 342/135; 342/21; 342/27; 342/70; 342/89; 342/118; 342/134; 342/175; 342/195; 375/295; 375/316; 375/340
(58) Field of Search .................. 342/21, 27, 28, 342/70, 71, 72, 118, 134, 135, 175, 195, 13, 89, 93; 375/130–153, 295, 309, 316, 338, 340

(56) References Cited

U.S. PATENT DOCUMENTS

| | | | | |
|---|---|---|---|---|
| 3,934,252 | * | 1/1976 | Ross et al. | 342/21 |
| 5,146,616 | * | 9/1992 | Tang et al. | 342/13 X |
| 5,239,309 | * | 8/1993 | Tang et al. | 342/13 |
| 5,337,054 | * | 8/1994 | Ross et al. | 342/93 |
| 5,361,070 | * | 11/1994 | McEwan | 342/21 |
| 5,381,151 | * | 1/1995 | Boles et al. | 342/21 |
| 5,465,094 | * | 11/1995 | McEwan | 342/28 |
| 5,519,400 | * | 5/1996 | McEwan | 342/28 |
| 5,523,760 | * | 6/1996 | McEwan | 342/89 |
| 5,610,611 | * | 3/1997 | McEwan | 342/89 |
| 5,901,172 | * | 5/1999 | Fontana et al. | 342/21 X |

* cited by examiner

Primary Examiner—Bernarr E. Gregory
(74) Attorney, Agent, or Firm—McIntyre Harbin & King

(57) ABSTRACT

A highly sensitive, high-speed dual tunnel diode detector is described for use in Ultra Wideband (UWB) object detection systems, such as a radar. The extended capability of the detector to both extremely short (sub-foot) and long distance (tens of thousands of feet) ranges is unique and permits the application of low power UWB radar to a wide variety of applications including high resolution radar altimetry at altitudes exceeding 10,000 feet and for autonomous on-deck landing operations (e.g., one-foot altitudes), the detection of extremely low radar cross section (RCS) targets for such applications as suspended wire detection for helicopters and other manned and unmanned craft, etc. High noise and interference immunity of the detector permits co-location of a UWB radar sensor with other active systems. The invention has immediate and significant application to all areas, both military and commercial, of precision distance measurement, intrusion detection, targeting, etc. over a wide range of distances.

25 Claims, 4 Drawing Sheets

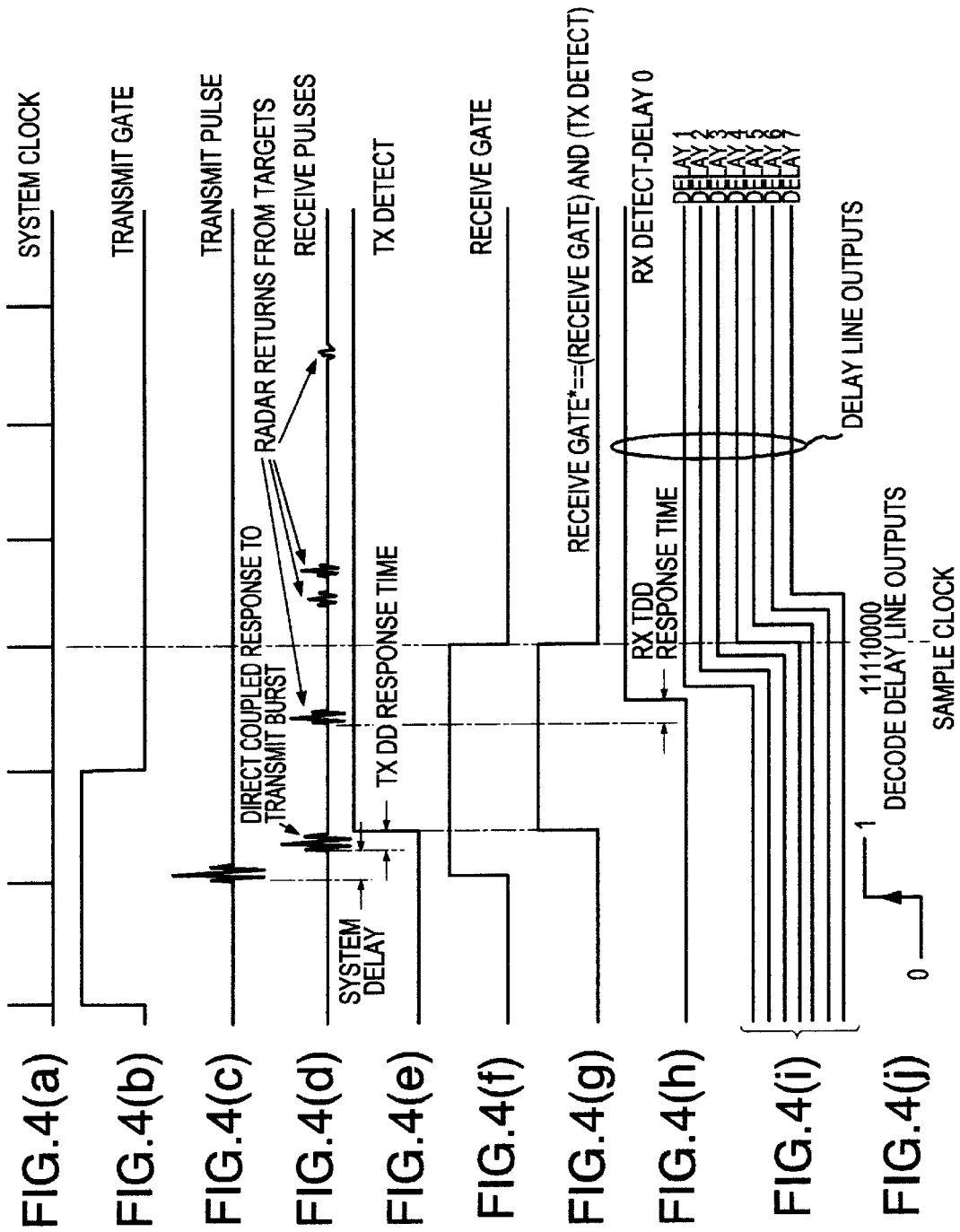

UWB DUAL TUNNEL DIODE DETECTOR FOR OBJECT DETECTION, MEASUREMENT, OR AVOIDANCE

BACKGROUND OF THE INVENTION

1. Field of the Invention

This invention relates to the field of measuring and detecting systems utilizing ultra wideband (UWB) radar techniques. More particularly, the invention relates to methods and systems for reliably receiving and processing UWB electromagnetic pulses to determine the presence or the range of a target.

2. Background of Related Art

Ultra wideband (UWB) waveforms have been used in measuring and detecting systems and methods to attain extremely fine, sub-foot resolutions because of their extremely short (subnanosecond to a few nanoseconds) durations. With the advent of very high speed, high sensitivity detectors (see, for example, U.S. Pat. No. 5,901,172 in the name of inventors Fontana and Larrick, entitled ULTRA WIDEBAND RECEIVER WITH HIGH SPEED NOISE AND INTERFERENCE TRACKING THRESHOLD, incorporated herein by reference), the feasibility of such systems has been demonstrated.

UWB (also referred to as carrier-free, impulse, or baseband) waveforms have been proposed to determine the relative position of a target for ship docking (Ross, U.S. Pat. No. 4,510,496), for precision radar ranging for intrusion detection and alert systems (Woolfolk, U.S. Pat. No. 5,148,175), as speed and motion sensors (Mara, Nicolson and Ross, U.S. Pat. No. 4,152,701; McEwan, U.S. Pat. No. 5,361,070); for target range detection of slowly moving targets (Henning and Woolfolk, U.S. Pat. No. 5,049,887), for liquid level sensing (Rama and Robbins, U.S. Pat. No. 4,489,601), for buried mine detection, and many other purposes.

While originally described for communications applications, the high sensitivity, high-speed tunnel diode detector described in U.S. Pat. No. 5,901,172 can also be directly used in a UWB radar application. Specific advantages of this tunnel diode detector are its very high sensitivity and its high noise and interference immunity. The high sensitivity of the detector permits the application of low power (i.e., less than a few watts of peak pulse power) UWB radar to high resolution radar altimetry at altitudes exceeding 10,000 feet; and the detection of extremely low radar cross section (RCS) targets for such applications as suspended wire detection for helicopters and other manned and unmanned craft. High noise and interference immunity permits the co-location of a UWB radar sensor with other active onboard systems.

However, the minimum time to reset a single UWB detector element precludes the use of the detector for radar ranges less than approximately 50 feet (i.e., approximately 100 ns roundtrip delay). An application of the tunnel diode circuit of the present invention permits a significant reduction in the minimum achievable detection range to less than one foot. This minimum achievable range is attained without loss of the high sensitivity required for long range and low RCS applications. The reduction in minimum achievable range extends the applicability of the high sensitivity radar sensor to obstacle and collision avoidance for small unmanned vehicles, autonomous landing systems, intrusion detection, and a wide variety of other applications within the realm of knowledge of persons skilled in the art.

SUMMARY OF THE INVENTION

It is therefore an object of the present invention to provide a highly sensitive, high-speed dual tunnel diode detector for object detection and measuring applications.

It is further an object of the present invention to provide a dual tunnel diode detector for UWB radar applications.

It is a further object of the present invention to provide a high-speed UWB radar detector capable of measuring range to within one foot of the antenna.

It is a further object of the present invention to provide a method for precision range measurements or obstacle/collision avoidance using the high sensitivity detector.

In accordance with an aspect of the present invention, a precision radar altimeter and obstacle/collision avoidance sensor comprises an impulse source, wideband antennas, RF front end, dual tunnel diode detector, and digital processing circuitry.

Other aspects, objectives and attributes of the invention will become readily apparent by the following description and the accompanying drawings. The invention, though, is pointed out with particularity by the appended claims.

BRIEF DESCRIPTION OF THE DRAWINGS

FIGS. 4(a) through 4(j) are a system timing diagram depicting operation of the dual tunnel diode detectors.

DETAILED DESCRIPTION OF ILLUSTRATIVE EMBODIMENTS

Figure 1:
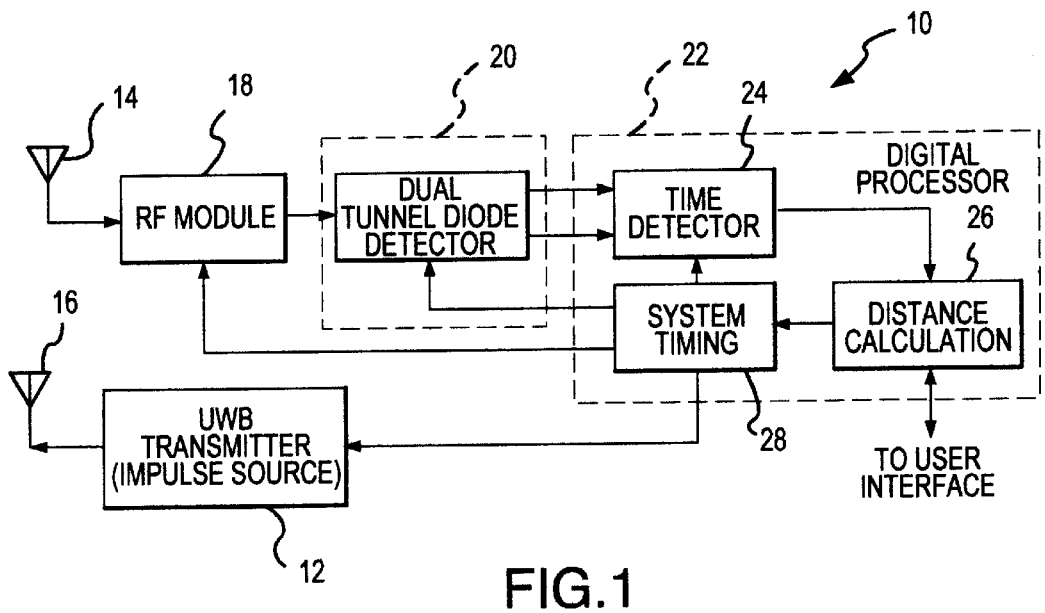
FIG. 1 is a block diagram of an object detection and measuring system utilizing an ultra wideband radar system having dual tunnel diode detectors in accordance with the present invention.

A block diagram of a short pulse radar system 10 having object detecting and measuring capabilities in accordance with the teachings of the present invention is shown in FIG. 1. The exemplary radar system includes five submodules: a UWB transmitter or impulse source 12, a transmit/receive antenna or antennas 14 and 16, an RF amplifier and filter (RF Module) 18, a dual tunnel diode detector module 20, and a digital processor 22.

The UWB transmitter or impulse source 12 emits a short duration pulse (FIG. 4(c)) at either a fixed or variable rate in accordance with clock pulses (FIG. 4(a)) from system timing circuit 28, and radiates this pulse through the use of broadband antenna 16 matched to the desired source frequency characteristics of UWB transmitter 12. A suitable UWB transmitter was described in U.S. patent application Ser. No. 08/857,836 by Larrick and Fontana, entitled FREQUENCY ADAPTIVE ULTRA-WIDEBAND TRANSMITTER, filed May 16, 1997, now U.S. Pat. No. 8,026,125, incorporated herein by reference, which describes the structure of a low cost, precision UWB waveform generator.

A second wideband receive antenna 14 intercepts both a primary transmit pulse (FIG. 4(c)) directly from the transmitter 12 (which acts as a timing reference signal) as well as one or more reflected, secondary pulses from objects within the field of view of antenna 14. One advantage of the two antenna approach is that differential time delays which may exist between the receive and transmit paths of the radar system 10 are automatically calibrated out. These time delays can result from differences in cable lengths to the antennas, variations in filter group delays, etc.

While a separate receive antenna is shown in FIG. 1, it is also possible to utilize a single antenna to accommodate both transmit and receive functions. In the case of a single antenna serving the functions of antennas 14 and 16, a reference signal can be generated through the use of a small pulse "sniffer" (or probe) attached on or near the primary antenna. In this case, the radar system must be calibrated to remove any differential delay between receive and transmit paths.

RF Module 18, preferably including low noise highgain wideband amplification and suitable RF filtering, is used to further amplify the received UWB pulses to levels suitable for use by the high sensitivity pulse detector circuitry 20.

In accordance with an aspect of the present invention, detector 20 comprises a dual tunnel diode detector (DTDD) module which includes one tunnel diode detector (TDD) for detection of the primary transmit pulse that is locally generated and a second TDD for detection of secondary reflected pulses returned from one or a multiplicity of targets (not shown). Use of a dual detector configuration advantageously permits, when using repetitive UWB pulse transmissions that are closely spaced in time, rapid acquisition of pulse returns from targets which can be as close as one foot from the radar antenna. When a single TDD is used, a blanking interval can be employed during primary pulse transmissions to avoid triggering the detector until receipt of a return pulse, but after receipt of the return pulse, a recovery period is nevertheless required before a subsequent pulse may be detected.

Outputs from the DTDD 20 are latched and passed to a time detector circuitry 24 within the digital processor sub-module 22. The time detector 24 measures or detects the relative time difference of arrival between the locally generated transmit pulse (local reference) and each detected return pulse(s) that is reflected from an object. This time difference information is subsequently forwarded to a controller, microcontroller, or digital signal processor (DSP) (i.e., distance calculation circuit 26) to convert the time difference, i.e., delta time of arrival, into a distance measurement. A system timing circuit 28, preferably within the digital processor module 22, generates reference clock pulses (FIG. 4(a)) which are used to initiate pulse transmission by UWB transmitter 12 and for timing the operations of the RF receiver module 18, DTDD 20 and time detector 24.

Figure 2:
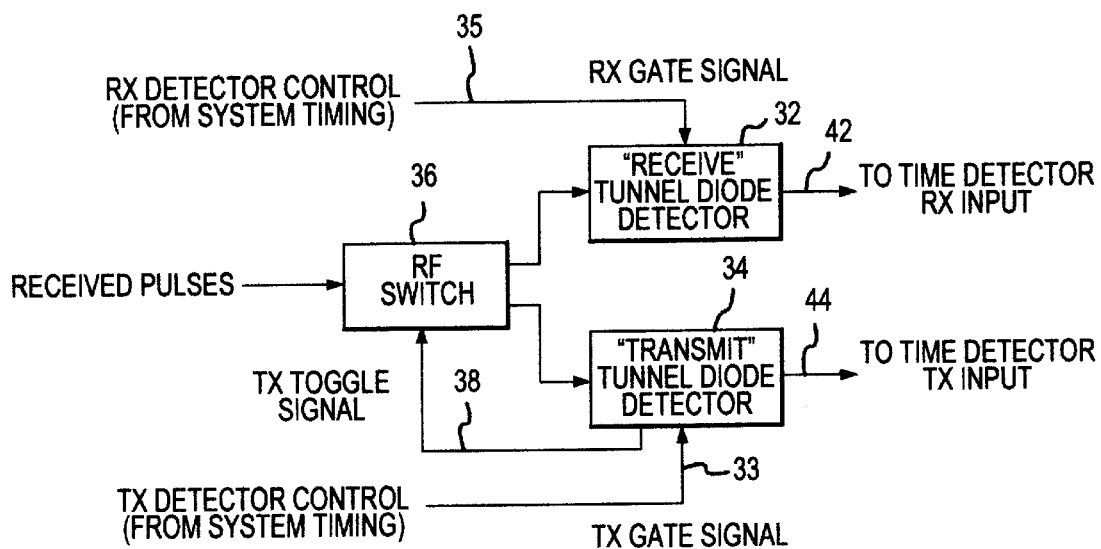
FIG. 2 is an expanded diagram of the dual tunnel diode detectors of FIG. 1 including RF input and digital output interfaces.

FIG. 2 is a block diagram of the dual tunnel diode detector module. Each of the tunnel diode detectors 32 and 34 is similar to that described in U.S. Pat. No. 5,901,172 (incorporated herein), and includes a self-calibrating bias control circuit that maintains a desired constant false alarm rate (CFAR). In the transmit TDD 34, the signal-to-noise ratio is very high and the tunnel bias can be reduced to guarantee a negligibly small false alarm rate. As described in U.S. Pat. No. 5,901,172, outputs of the tunnel diodes are latched by the circuit shown in FIG. 3 and are maintained at logic one levels until the devices are physically reset.

A high speed RF switch 36 initially couples the output from the RF Module 18 (FIG. 1) (and thus from the receive antenna) to the "transmit" (TX) tunnel diode detector 34 in order to capture the primary transmit UWB pulse directly from transmitter 12. Upon detection of the transmit pulse, the TX TDD 34 asserts a signal on line 38 to toggle the RF switch 36 to route incoming UWB pulses to the "receive" (RX) TDD 32. In this position, reflected UWB radar return pulses are sent to the RX TDD 32 for detection. Using this technique, it is no longer necessary to await resetting of the TX TDD 34 before processing subsequent radar return pulses. In a detector circuit employing only a single TDD, it is necessary to wait until the tunnel detector is reset after it is triggered by the primary transmit pulse before enabling the detector to receive secondary radar pulse reflections. Since the TDD reset time is appreciably longer than the tunnel diode response time, this produces a dead zone for short range events, which has been overcome by the present invention.

As the output of the TX TDD 34 is used to directly control the switching path of the RF switch 36, the minimum measurable time difference (and, hence, the minimum achievable range) is determined by the sum of the TX TDD comparator propagation delay and the RF switching time of switch 36. According to an exemplary construction of the present invention, the sum of these two time constants can be made in less than two nanoseconds for a minimum achievable range of approximately one foot. Outputs 42 and 44 of the dual tunnel diode detector 32 and 34 are then fed to the time detector 24 within the digital processor.

Figure 3:
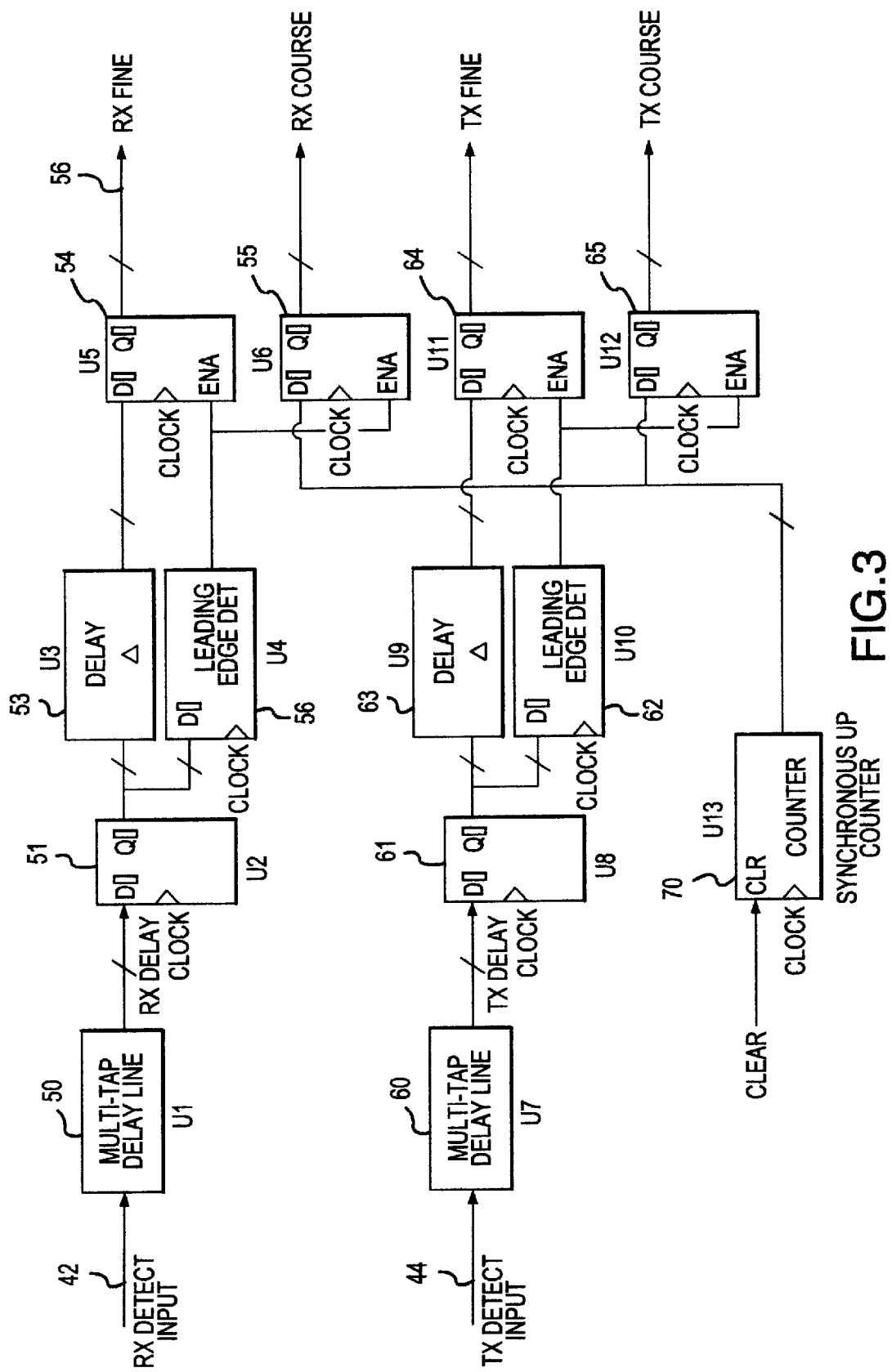
FIG. 3. is a schematic diagram of an exemplary time detector for the digital processor subsystem of FIG. 1 that interfaces the dual tunnel diode detector elements.

FIG. 3 depicts a block diagram of the time detector 24 (FIG. 1) and FIG. 4 shows a timing diagram which illustrates the operation of multi-tap delay lines 50 and 60 and time detector digital circuitry used to achieve fine range resolution.

As illustrated in FIG. 3, both RX and TX TDD latched outputs on lines 42 and 44 are each fed to individual multiple-tap delay lines 50 and 60, respectively. In one embodiment of use as an ultra wideband radar altimeter, a 10-tap delay line was used with the taps spaced at every two nanoseconds to provide for one foot range resolution. The delay was equal to one tenth of the system clock period of twenty nanoseconds (i.e., 50 MHz clock frequency) between clock pulses (FIG. 4(a)).

The use of multi-tapped delay lines 50 and 60 allows for a finer time (and, hence, distance) resolution than can be achieved with the system clock alone. Thus, less expensive, lower frequency clock oscillators and/or crystals can be used in the design. The operation proceeds as illustrated in the timing diagram of FIG. 4(a) through 4(j).

System clock pulses (FIG. 4(a)) synchronize both the transmit gate pulse of FIG. 4(b) that is applied to transmit tunnel diode detector 34 via line 33 (FIG. 2) and the receive gate pulse of FIG. 4(f) that is applied to receive tunnel diode detector 32 via line 35 (FIG. 2). The transmit gate (FIG. 4(b)) activates the TX TDD 34 for detection of a transmit burst; while the receive gate activates the RX TDD 32 for reception of reflected return pulses.

The time displacement of the transmit gate of FIG. 4(b) is selected to overlap the known time of occurrence for the transmit pulse of FIG. 4(c). Upon detection of transmit pulse by the TX TDD 34, a TX detect signal (FIG. 4(e)) is asserted HIGH. The TX detect signal is then supplied to the multi-tap delay line 60 having multiple, delayed asserted outputs as represented by FIG. 4(i).

The time displacement of the receive gate of FIG. 4(f) is selected to correspond with the desired or expected range at which the presence or absence of a reflected pulse (e.g., a target return) is to be measured. In radar terminology, the receive gate is often referred to as the "range gate". To prevent the primary transmit signal from triggering the RX TDD 32, the receive gate signal is logically AND' ed with the TX detect signal (FIG. 4(e)) to produce the receive gate* signal of FIG. 4(g). The receive gate* signal of FIG. 4(g) differs from receive gate signal of FIG. 4(f) for the lowest possible range bin, since the TX detect signal of FIG. 4(f) is asserted HIGH within only a few nanoseconds after initiation of the transmit pulse (FIG. 4(c)). This action is equivalent to that of a blanking pulse in conventional radar designs.

Upon detection of a reflected pulse within the receive gate (or receive gate*) interval, the RX detect signal goes HIGH and is passed to the multi-tap delay line 50. The precision calculation of the pulse time-of-arrival, i.e., the target range, is now performed by time detector 24 and digital processor circuitry 22. Since the operations of the receive or target portion of the processor (i.e., 50 through 55, inclusive) are identical to that of the transmit or reference portion of the processor (60 through 65, inclusive), only the receive portion will be described in detail.

The output of the multi-tap delay line 50 produces a collection of time-shifted replicas (FIG. 4(i)) of the latched output from the RX tunnel diode detector 32. At the end of the receive gate interval (FIG. 4(f)), an output vector of the delay line 50 is sampled via synchronous register 51 and simultaneously fed to leading edge detector 52 and delay 53. Thus, the output vector from the time-sampled multi-tap delay line 50 depends upon the location of the received pulse (FIG. 4(d)) within the receive gate interval (FIG. 4(f)). For example, if the pulse occurs within the first T/N seconds [0, T/N] of the receive gate interval (where T is the receive gate duration and N is the number of taps in the multi-tap delay line 50), then the output vector will be all "ones" $\{1\ 1\ 1\ \ldots\ 1\}$. (The notation [x,y] represents the time interval $x \leq t \leq y$; while (x,y) represents the time interval $x < t \leq y$.)

In general, if the received pulse occurs within the ((j−1) T/N, jT/N] interval of time after the initiation of the receive gate (where j=1, 2, ..., N), then the output vector will be a sequence of N−j+1 "ones" followed by a sequence of j−1 "zeros" $\{1\ 1\ 1\ \ldots\ 1\ 0\ 0\ 0\ \ldots\ 0\}$. Hence, by observing the sampled output vector, one can determine the precise time-of-arrival of the pulse within the larger receive gate duration to an accuracy determined by the number of taps in the multi-tap delay line 50 and the precision to which these tap delays are generated.

Leading edge detector 52 is a logic circuit that is used to verify that a valid vector has been received. In its simplest implementation, detector 52 performs a logic OR operation on the N vector samples. Thus, if any "one" occurs in the sequence, it is determined that the data is valid. Delay 53 is used to compensate for any time-delay in the operation of leading edge detector 52 and may be required for high speed operation. A more complex logic structure for delay 53 can be used for increased noise immunity, particularly at high speed operation. In this case, additional logic can be used to determine the validity of the recovered vector sequence. With high speed TDD reset circuitry, it is also possible to detect more than one target within a single range bin or receive gate duration. In this case, 53 can be used to identify multiple targets by suitably parsing the received sample vector.

Upon verification of data validity, leading edge detector 52 enables an output latch 54 which is used to clock the received data vector into a distance calculation computer 26 (FIG. 1). Note that output 56 of latch 54 provides a FINE resolution component of the range indication, as it establishes the absolute position of the return signal with respect to the start of the receive gate interval. To determine absolute range, it is also necessary to know the exact starting time of the receive gate pulse (FIG. 4(f)). This information is provided through the use of synchronous up-counter 70 which counts the number of system clock intervals from initiation of the transmit gate (FIG. 4(b)). (Counter 70 can be cleared or reset one system clock cycle prior to initiation of the transmit gate.) The output vector from 70 is also latched by latch 55 upon verification of a valid return signal, and is used by the distance calculation computer 26.

The precise offset of the transmit pulse (FIG. 4(c)) from the beginning of the transmit gate interval (FIG. 4(b)) is determined through a similar process utilizing circuits 60 through 65, inclusive. Thus, the final precision range calculation is accomplished by (a) determining the precise time of occurrence of the leading edge of the receive gate relative to the leading edge of the transmit gate; (b) determining the precise time offset of a reflected pulse return from the leading edge of the receive gate; and (c) subtracting off the precise offset of the transmit pulse from the leading edge of the transmit gate. Through this process, range measurements can be made to sub-foot resolutions. Since the tunnel diode detector can respond to impulse signals in less than 100 picoseconds, range resolutions of less than one inch can be achieved. Range resolution is ultimately limited by any clock skew across the digital electronics; however, clock skews of less than 100 picoseconds are now commonly available. Range accuracy is ultimately limited by master clock oscillator stability and by the accuracy of the differential tap delay positions within the multi-tap delay lines. However, resolutions and accuracies of less than one foot have been achieved in a practical embodiment of the design as both a radar altimeter and obstacle avoidance sensor.

Figure 5A:
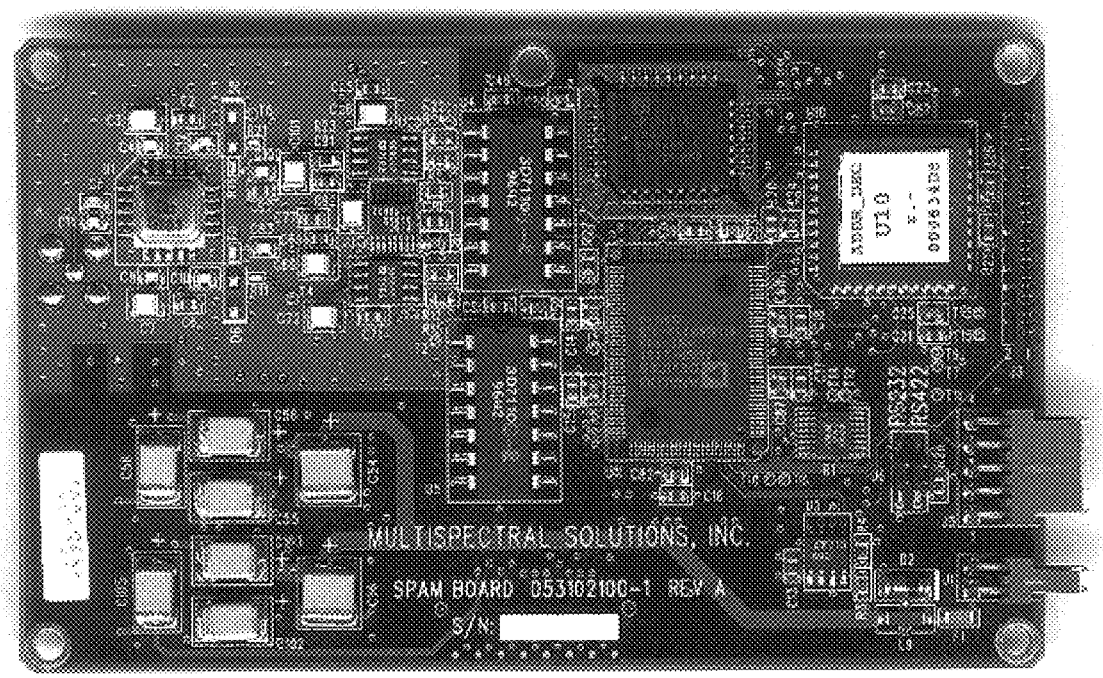
FIGS. 5(a) and 5(b) are photographs of the physical embodiment of the dual tunnel diode detectors in a short range radar designed for altimetry and obstacle avoidance applications.
Figure 5B:
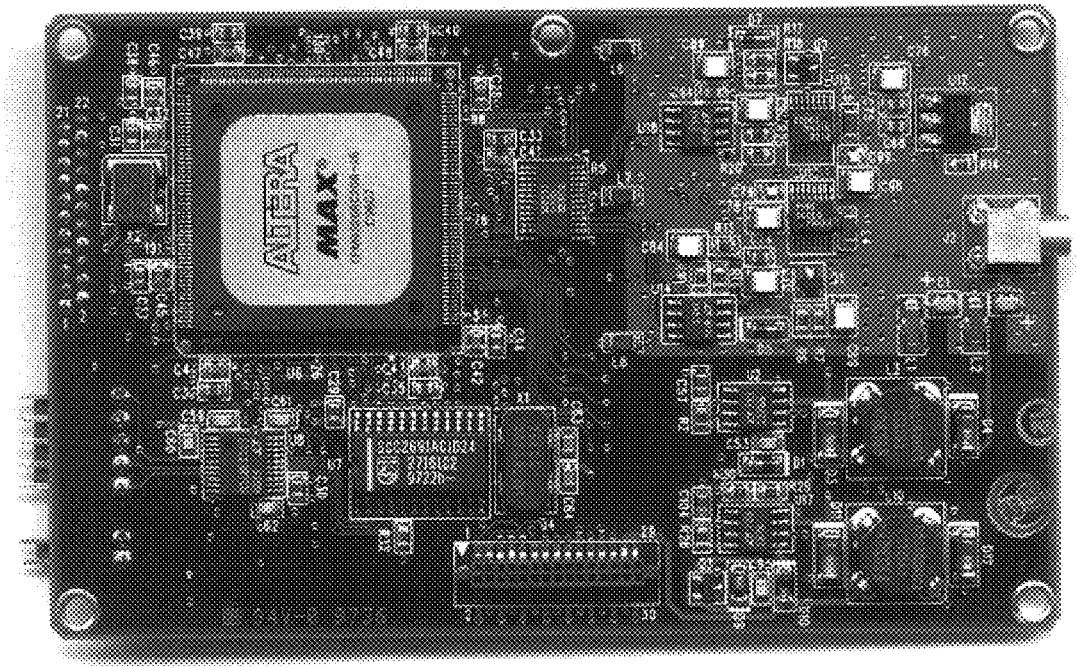

FIGS. 5(a) and 5(b) show physical component layouts on printed circuit boards incorporating circuits constructed in accordance with the present invention.

In operation, the position of the receive gate is varied on either a pulse-by-pulse or multi-pulse basis to allow for the radar to scan over various ranges of interest. In one embodiment of the invention as a UWB radar altimeter and obstacle avoidance sensor, the receive gate start position was incremented by one-half gate width every M transmit pulses, with M being user selectable. The radar effectively dwells at the selected range for M transmit pulses, and the digital processor counts the number L of return pulses detected out of the M dwells. If L/M is greater than some user selectable threshold, the particular receive gate is flagged as containing a valid return and the average of the measured distances are calculated.

In an embodiment of the invention as a radar altimeter, the distance from the range bin that produces the greatest number of returns is used as the range estimate; while an embodiment of the invention as in an obstacle avoidance sensor, any valid target return is flagged as an obstacle. A wide variety of algorithms can be used to process the radar return data.

The above description sets forth illustrative embodiments of the invention and is not intended to limit the scope of the invention defined by the appended claims. In addition, no part of the above description is intended to be read into the appended claims unless language of a claim explicitly embraces such description. Unless otherwise defined, the inventor does not ascribe any special meaning to descriptive terms and expressions used in the above description, but instead adopts an ordinary and plain meaning of such terms and expressions as known and used by persons having skill in the art.

In view of the above, what is claimed is:

1. An object detector comprising an ultra wideband pulse source, a first tunnel diode detector that detects a primary pulse transmitted by said source, and a second tunnel diode detector having a gate that is opened in response to detection of said primary pulse by said first tunnel diode detector thereby to enable the second tunnel diode detector to detect a reflected pulse from an object.

2. The object detector as recited in claim 1 further including a microcontroller that controls an initiation of said pulse source and opening of said first and second gates of said tunnel diode detectors.

3. The object detector as recited in claim 1, further including a receiver connected with said second tunnel diode detector that receives said second reflected pulse.

4. The object detector as recited in claim 1, further including a receiver that receives the primary and reflected pulses, a switch connected with the receiver that alternately routes received pulses to one of said first and second tunnel diode detectors, and processing circuitry that controls the switch according to detection of the primary pulse.

5. A method of short-range detection of an object comprising the steps of generating an ultra wideband pulse, gating a first ultra wideband detector to receive a transmit pulse during a transmit interval, gating a second ultra wideband detector to receive a reflected pulse during a receive interval that is determined in response to detection of said transmit pulse by said first ultrawide band detector, and determining the range of said object according to a time difference between detecting the transmit and reflected pulses during the respective transmit and receive intervals.

6. The method as recited in claim 5 further including the step of providing mutually exclusive transmit and receive intervals in which to detect said transmit and reflected pulses.

7. The method as recited in claim 5 further including the step of providing multi-stepped delays during said receive interval and detecting the characteristic of delayed outputs thereof in order to ascertain fine gradations of range of detection of said object.

8. The method as recited in claim 5 further including the step of time-displacing said receive interval during a period of desired range detection.

9. The method of claim 5, wherein said first and second ultra wideband detectors comprise tunnel diodes.

10. A radar altimeter utilizing ultra wideband pulses comprising:
   an ultra wideband pulse source,
   a first ultra wideband detector that detects a primary pulse transmitted directly from said source,
   a second ultra wideband detector that detects a reflected pulse from a surface, and
   processing circuitry that controls said first detector to detect said primary pulse during a transmit interval and that controls said second detector to detect reflected pulses during a receive interval that is determined based on detection of said primary pulse during said transmit interval, and or determining a time difference between detection of said primary and reflected pulses whereby to ascertain a distance-to-surface measurement.

11. The radar altimeter as recited in claim 10 wherein said digital processor includes a time detector including a multi-tapped delay line connected at the output of at least one of said first and second detectors for providing a representation of multiple gradations of distance measuring signals.

12. The radar altimeter as recited in claim 10 wherein said digital processor uses said transmit pulse as a timing reference signal.

13. The radar altimeter as recited in claim 10 including a common transmit and receive antenna in communication with said ultra wideband pulse source and said first and second ultra wideband detectors.

14. The radar altimeter as recited in claim 10, wherein said first and second ultra wideband detectors comprise tunnel diodes.

15. An object detection system for ascertaining a distance measurement, said system comprising:
   an ultra wideband pulse source,
   a first ultra wideband detector that detects a primary pulse transmitted directly from said source,
   a second ultra wideband detector that detects a reflected pulse from an object, and
   a controller that controls said first detector to detect said primary pulse during a transmit interval and that controls said second detector to detect said reflected pulse during a receive interval that commences in response to detection of said primary pulse during said transmit interval, and for determining a time difference between detection of said primary and reflected pulses whereby to ascertain a distance measurement.

16. The object detection system as recited in claim 15 wherein said controller determines said time difference using said primary pulse as a time reference signal.

17. The object detection system as recited in claim 15 including a common transmit and receive antenna in communication with said ultra wideband pulse source and said first and second ultra wideband detectors.

18. The object detection system as recited in claim 15, wherein said first and second ultra wideband detectors comprise tunnel diodes.

19. An object avoidance system comprising:
   an ultra wideband pulse source,
   a first ultra wideband detector that detects a primary transmit pulse transmitted directly from said source,
   a second ultra wideband detector that detects a reflected pulse from an object, and
   a digital processor that controls said first detector to detect said primary pulse during a transmit interval and that controls said second detector to detect said reflected pulse during an adjustable receive interval following detection of said primary pulse during the transmit interval, said digital processor generating an alarm upon detection of an objection within said adjustable receive interval.

20. The object avoidance system as recited in claim 19 wherein said digital processor uses said primary transmit pulse received by said first detector as a timing reference signal to adjust said adjustable receive interval.

21. The object avoidance system as recited in claim 19 further including a multi-tapped delay line to generate representations of gradations of distance measurements of an object within said adjustable receive interval.

22. The object avoidance system as recited in claim 19 further including a common transmit/receive antenna in communication with said pulse source and said first and second detectors.

23. The object avoidance system as recited in claim 19, wherein said first and second ultra wideband detectors comprise tunnel diodes.

24. An object detection system using ultra wideband pulses for measuring the range of an object, said detector comprising:
   an ultra wideband pulse transmitter including a transmit antenna, an ultra wideband receiver having a receive antenna and an RF module that amplifies signals received by said receive antenna, a dual tunnel diode detector module that receives amplified signals from said RF module, said dual tunnel diode module including a transmit tunnel diode that receives a transmit pulse transmitted directly from said pulse transmitter to said receive antenna and a receive tunnel diode that receives a reflected pulse from said object, and a switch that routes signals received by said RF module either to said transmit tunnel diode or to said receive tunnel diode, and a digital processor that controls the operation of said pulse transmitter and said dual tunnel diode detector module by generating timing pulses that initiate transmission of ultra wideband pulses from said pulse source and that activate the transmit tunnel diode to receive a transmit pulse and the receive tunnel diode to receive a reflected pulse during mutually exclusive transmit and receive intervals, respectively, each of said receive intervals being initiated according to detection of said transmit pulse during a transmit interval, said digital processor further performing operations to calculate the range of the object according to the time-difference between detection of said transmit and reflected pulses.

25. The object detection system as recited in claim 24, wherein said first and second ultra wideband detectors comprise tunnel diodes.

* * * * *